United States Patent [19]

Vangen

[11] 4,337,463
[45] Jun. 29, 1982

[54] TIME SYNCHRONIZATION MASTER STATION AND REMOTE STATION SYSTEM

[75] Inventor: Robert F. Vangen, Plymouth, Minn.

[73] Assignee: Control Data Corporation, Minneapolis, Minn.

[21] Appl. No.: 180,243

[22] Filed: Aug. 22, 1980

[51] Int. Cl.³ .............................................. H04Q 9/00
[52] U.S. Cl. ............................. 340/825.3; 340/309.1; 340/870.04; 368/47; 375/110; 340/825.54; 340/825.69; 340/825.2
[58] Field of Search ............................... 340/694–696, 340/309.1, 151, 152 R, 152 T, 147 SY, 870.02, 870.03, 870.04, 870.13, 870.14; 368/47; 375/106, 110, 114; 179/6 TA

[56] References Cited

U.S. PATENT DOCUMENTS 4,114,141 9/1978 Travis ........................... 340/147 SY
4,117,661 10/1978 Bryant ........................... 340/147 SY Primary Examiner—John W. Caldwell, Sr.
Assistant Examiner—Donnie Lee Crosland
Attorney, Agent, or Firm—William J. McGinnis, Jr.; Joseph A. Genovese

[57] ABSTRACT

A time synchronization system involves a master station sending time information to a remote station and in which a portion of the time message is used as a trigger to start a counter or interval clock in the remote station. When the time message is concluded, the remote station adds the time in the interval clock or counter to the time from the message received to create an actual time which replaces the existing time information in the remote station clock. The time portion of the message sent represents the actual time at which the trigger in the time message was actuated and represents a later portion of the message as sent.

2 Claims, 3 Drawing Figures

TIME SYNCHRONIZATION MASTER STATION AND REMOTE STATION SYSTEM

BACKGROUND OF THE INVENTION

The present invention relates to a time synchronization transmitter-receiver system to be used between a master station and a remote station in any system in which the actual time of events needs to be known. An example of an application of this invention would be in the electric utility industry where various remote stations record electric meter readings on various branches and the actual time of the meter reading must be recorded. The present invention provides for a master station, such as the electric utility headquarters, to periodically update various substations with the actual time of day reading so that the remote station clock will accurately record the time of day of electric meter readings.

The need for this periodic time of day updating is necessitated by such things as power outages or brief power interruptions which may delay time clock data or perhaps destroy time clock data altogether. The necessity of recording the actual time of day together with electric meter readings is caused by the practice of electric utilities to bill electricity at different rates depending upon time of day usage. This is related to the well-known fact that electricity generated at peak electric demand times tends to be higher cost because of less efficient generating plants and higher cost fuels used in such plants. Obviously, this invention would have application to any use involving various remote stations which must have a local clock having accurate time of day information.

The prior art related to the recording of events at remote stations tends to deal more with the synchronization of events at a remote station to a master station than to the provision of an accurately synchronized actual time of day signal for a remote station clock. For example, U.S. Pat. No. 4,114,141 shows the use of UP-counters in a central station to accumulate information in synchronization with DOWN-counters at remote stations counting to zero. The synchronization is provided by the power line frequency. The mark-space transitions are broadcast as radio timing signals. The term synchronization as used in connection with the patent is related to the coordination of master and remote transmission of information. The present application is related to the synchronization of an actual time of day clock at a remote station with respect to a master clock at a master station.

Also known to applicant in U.S. Pat. No. 3,798,650 which shows the use of a counter actuated upon receipt of a synchronization signal to produce an internal count representing the time interval until the occurrence of an internal reference pulse. This interval count is then used to perform various functions. U.S. Pat. No. 3,142,802 shows a counter means actuated by a remote unit and used internally in a local unit to derive synchronous pulse signals. Again, these patents use the term synchronization in the sense of locking activities in step with one another or causing an activity to be set to an initial state.

SUMMARY OF THE INVENTION

The present invention is a transmitter-receiver system for accurately and periodically updating a local clock at a remote station to be synchronized with a master clock at a master station. Application is found particularly in the utility industry.

The master station contains a transmitter and a master time clock. The master station transmitter generates a timing information signal addressed to a particular remote station having a header containing address information, various check characters, a pair of codes referred to as the mark code and the sync code, the actual time information and various end of message signals including check character digits for the time information. The interval between the mark code and the sync code is referred to as the mark-space transition and represents the trigger signal used by the master station clock to set the actual time of day in the remote station clock. The remote station contains a receiver, a clock, an interval clock or counter and a holding register. Upon receipt of the message, the various check characters are processed in conventional ways. The time information is entered into the holding register and the mark-space interval is used to start the interval clock or counter. When the message has been received and verified, the interval clock time is added to the time information received in the message to create an actual time which is then entered into the remote station clock.

A further modification of the invention may be obtained by placing a counter and remote time holding register in the master station so that the master station may receive the time information existing in the remote station clock. This remote time may be compared with the actual time in the master station. The clock may be used to generate an offset time signal to be used in updating the remote station clock. This offset time would relate to the communication time delay between the master station and the remote station so that this time delay could be eliminated and allow the remote station actual time clock to be exactly the same as the master station time clock. Otherwise, the remote station clock would be offset by the amount of time involved in the combination process.

IN THE FIGURES

DESCRIPTION OF THE PREFERRED EMBODIMENTS

Figure 1:
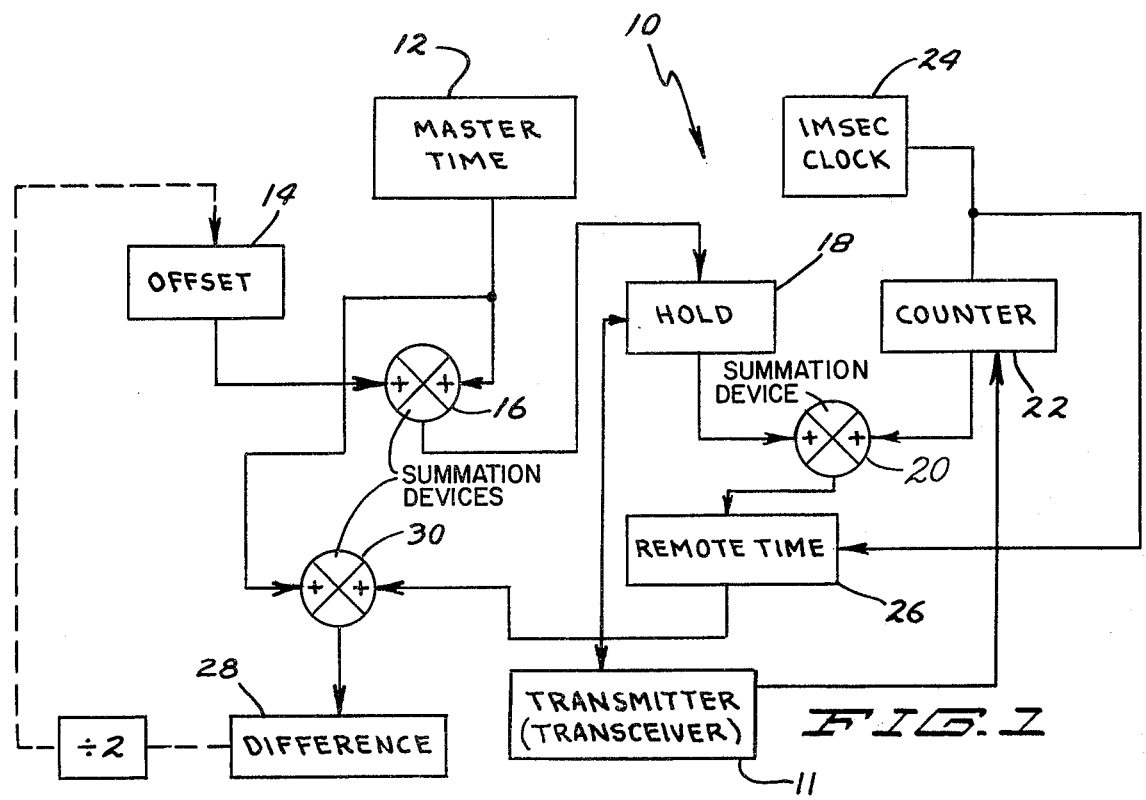
FIG. 1 is a master station for a time synchronization system according to the present invention shown in block diagram form.

Referring now to FIG. 1, a master station 10 according to the present invention contains a transmitter means 11 for creating the master station message, a master time clock 12 and an offset register 14. The master clock 12 is connected with a time summation device 16 together with the output from the offset register 14. Summation device 16 is connected with a holding register 18 which holds the time information generated by the summation device 16. Holding register 18 is connected with a time summation device 20. The other input to time summation device 20 is a counter 22 which serves as an interval clock or interval timer. The input to counter 22 is a clock update signal from a clock 24. For example, this clock may operate on a 1 millisecond time base.

The output of time summation device 20 is connected with a remote time register 26 as is another output of the clock signal from clock 24. The remote time register 26 is connected with a summation device 30 which has an output to a difference register 28. One output of the difference register 28 is time information which is divided by two and provided as an input to offset register 14.

Figure 2:
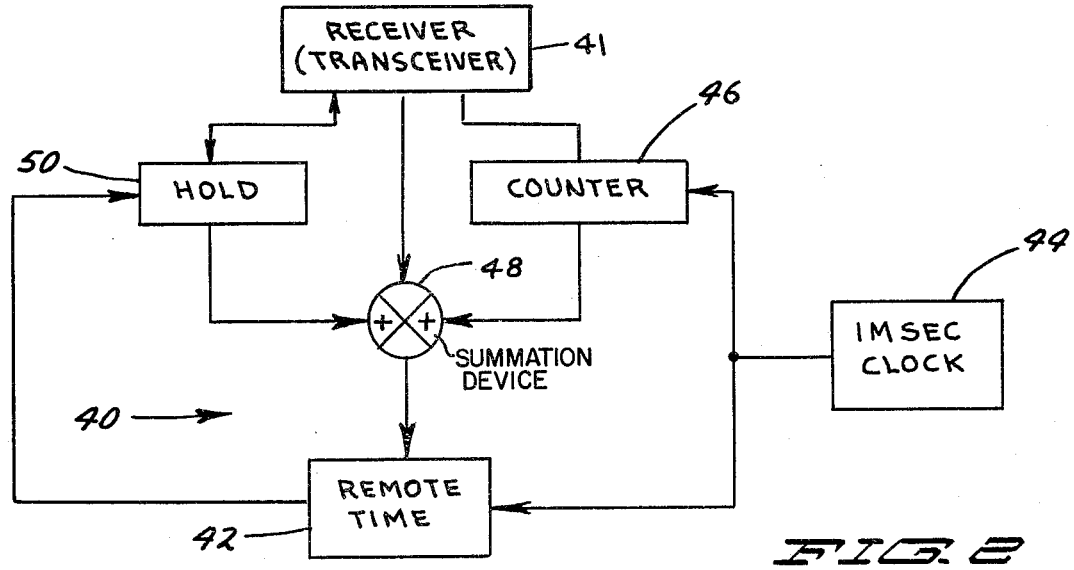
FIG. 2 is a remote station for a time synchronization system according to the present invention shown in block diagram form.

Referring now to FIG. 2, a remote station 40 according to the time synchronization system of the present invention has a receiver means 41 for receiving the time message and a remote time clock register 42. A clock 44 which operates on the same time base as the clock in the master station provides time base information to update the time in the remote clock 42. The clock 44 is also connected with a counter 46 which operates as an interval timer. Counter 46 is connected with a time summation device 48. The other input to time summation device 48 is the output of holding register 50.

Figure 3:
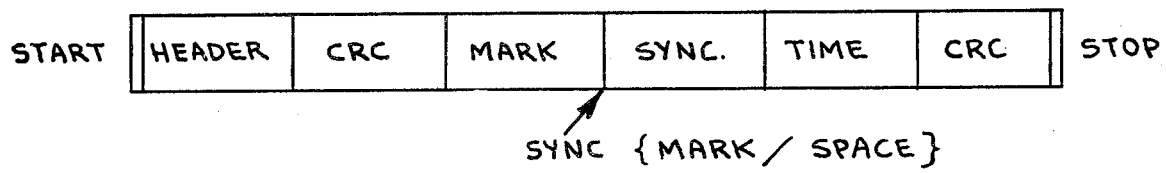
FIG. 3 shows the message format for a time synchronization system according to the present invention.

Referring now to FIG. 3, one appropriate message format for the system shown in FIGS. 1 and 2 operating according to the present invention is shown. A time message from the master station to the remote station contains a header portion which may for example be the address of the remote station plus an appropriate indication that a time message is being sent. The next block in the message format is the group of check characters necessary to verify the header information. The next two blocks in the message are standard blocks consisting of a mark block and a sync block. The interval between the mark and sync blocks referred to as the mark-space transition represents the trigger used in the receiver to start the interval timer 46 counting at the rate determined by clock 44. The last information in the time synchronization message is a check character block which verifies the time information being transmitted. The receiver is controlled so that the remote station clock is not updated unless the time information is fully verified by all check characters. Finally, the message format includes an appropriate end of message signal.

Referring now to FIG. 1, the operation of the present invention will be explained. For an initial transmission to a particular remote station, the offset parameter contained in register 14 will be set at zero. The master station transmitter 11 sends the appropriate time message header and check characters. Following that the mark sync blocks are transmitted to the receiver. At the mark-space transition, the master time from the master clock 12 is transferred to the holding register 18. The summation device 16 adds any time information in the offset time register 14 to the master time from register 12 as it is transferred to holding register 18. In the initial case, there is no offset time so that the master time from the master time register 12 is transferred directly to holding register 18. This occurs as the transmitter is generating the mark-space transition in the time message. As the message continues to be sent in serial fashion, the time information from holding register 18 is used as the time information in the message sent.

The remote station, shown in FIG. 2, decodes the appropriate time message header and check character information to determine that a time message is being received. When the mark-space transition occurs in the message, the remote counter 46 serving as a time interval clock is zeroed and then incremented by the clock 44 at the time base rate. The time information in the message received is entered into holding register 50. When the message received is verified, the contents of the counter 46 and the holding register 50 are summed by summation device 48 and entered into the remote station time clock 42 as the current actual time of day information. Thereafter, the time base clock 44 updates the remote time register 42 at the clock base rate to continuously provide the actual time of day information.

Similarly, the remote station can transmit its remote time clock information to the master station. Referring again to FIG. 1, time information received from the remote clock is placed in the remote time register 26. The difference between the remote time and the actual master time is computed by summation device 30 and the time difference is placed in time difference register 28. This time difference is equal to the sum of the master station to remote station and the remote station to master station transmission times. This time difference is divided by two and entered into the offset register 14. In future time transmissions from the master station to the remote station this offset time from the offset register 14 is summed by summation device 16 with the master time from register 12 as it is entered into the holding register 18. This offset or adjusted time information to allow for the transmission time from the master station to the remote station thus allows the clock in the remote station to be synchronized to a time so that the remote station clock will agree exactly with the master station clock.

What is claimed is:

1. A time synchronization system comprising a master station and a remote station so that the actual time of day information in a remote station clock can be adjusted to be the same as the master station time clock comprising:

a master station transmitter means for generating a master station time message, a master station time clock having actual time of day information, a holding register connected with said transmitter means and connected with the master station time clock for holding the actual time of day information indicated by said clock at the time a predetermined portion of the time message is sent and in which the contents of said holding register are sent as the time portion of the time message at a time subsequent to the predetermined portion of the time message, a remote station receiver means for receiving a time message, a remote station time clock to be adjusted to be the same time as the master station time clock having actual time of day information, a remote station base rate clock, a counter connected to said base rate clock and adapted to receive a control signal from said receiver means, a time information holding register adapted to receive a time message from said receiver means, and a summation device connected to said receiver means and connected to have an output to said remote time clock and having inputs connected to said holding register and said counter so that the time portion of said time message is entered into said holding register by said remote station receiver and so that said counter is actuated to count at the rate of the remote station base rate clock commencing at the predetermined portion of the time message received; wherein, at the conclusion of said time message the summation device adds the contents of said holding register and said counter and enters them into the remote station time clock as the current updated actual time of day.

2. The system of claim 1 wherein said master station is further comprised of:
   a remote station time register for receiving the remote station time,
   a remote station base rate clock,
   a counter connected to said base rate clock and adapted to receive a control signal from said remote station,
   a time difference register,
   means for determining the difference in time between said master station time clock and the remote time contained in said remote station time register and entering said difference into said time difference register,
   means for generating an offset time from the contents of said time difference register, and
   means for summing said offset time to the contents of said holding register for future time transmissions to compensate for transmission time delay.

* * * * *